[19] United States Patent
Huizar et al.

(10) Patent No.: US 10,691,209 B2
(45) Date of Patent: Jun. 23, 2020

(54) STYLUS WITH HAPTIC FEEDBACK FOR TEXTURE SIMULATION

(71) Applicant: Apple Inc., Cupertino, CA (US)

(72) Inventors: Richard G. Huizar, Sunnyvale, CA (US); Qiliang Xu, Livermore, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/012,683

(22) Filed: Jun. 19, 2018

(65) Prior Publication Data
US 2019/0384402 A1    Dec. 19, 2019

(51) Int. Cl.
*G06F 3/01* (2006.01)
*G06F 3/0354* (2013.01)

(52) U.S. Cl.
CPC .......... *G06F 3/016* (2013.01); *G06F 3/03545* (2013.01)

(58) Field of Classification Search
CPC ..... G06F 3/016; G06F 3/03545; G06F 3/0383
See application file for complete search history.

(56) References Cited

U.S. PATENT DOCUMENTS

| | | | |
|---|---|---|---|
| 4,751,741 A | | 6/1988 | Mochinaga |
| 4,868,351 A | * | 9/1989 | Watanabe ............ G06F 3/03545 178/19.03 |
| 5,565,632 A | * | 10/1996 | Ogawa ................. G06F 3/03545 73/862.041 |
| 7,138,976 B1 | * | 11/2006 | Bouzit .................... G06F 3/014 345/156 |
| 7,265,750 B2 | | 9/2007 | Rosenbera |
| 7,523,672 B2 | | 4/2009 | Lapstun et al. |
| 8,878,824 B2 | * | 11/2014 | Besperstov .......... G06F 3/03545 345/179 |
| 9,886,088 B2 | | 2/2018 | Dietz et al. |
| 10,234,962 B2 | * | 3/2019 | Obata ................. G06F 3/03545 |
| 10,268,288 B1 | * | 4/2019 | Wang ................... G06F 3/0383 |
| 2005/0248549 A1 | | 11/2005 | Dietz et al. |
| 2009/0315690 A1 | | 12/2009 | Hwang et al. |

(Continued)

FOREIGN PATENT DOCUMENTS

| CN | 102822784 | 12/2012 |
|---|---|---|
| CN | 105068680 | 11/2015 |

(Continued)

OTHER PUBLICATIONS

International Search Report and Written Opinion from PCT/US2018/053573, dated Mar. 13, 2019, 15 pages.

(Continued)

*Primary Examiner* — Tom V Sheng
(74) *Attorney, Agent, or Firm* — Morgan, Lewis & Bockius LLP

(57) ABSTRACT

A stylus can include a housing and a tip. A force-sensing system can detect movement of the tip relative to the housing when a force is applied to the tip. A haptic feedback system can move the tip relative to the housing, for example by inducing a magnetic field in magnetic elements connected to the tip and the housing. The haptic feedback can be used to render texture sensations to simulate drawing on a textured surface with the stylus. As such, the same tip that is used to provide inputs can receive haptic feedback during use. The user can continue to use the tip for input even as haptic feedback is also being applied to the tip.

19 Claims, 5 Drawing Sheets

(56) References Cited

U.S. PATENT DOCUMENTS

| | | | | |
|---|---|---|---|---|
| 2010/0038152 | A1* | 2/2010 | Kaneda | G06F 3/03545 178/18.07 |
| 2010/0207607 | A1* | 8/2010 | Katsurahira | G06F 3/03545 324/207.11 |
| 2012/0112894 | A1* | 5/2012 | Yang | G06F 3/016 340/407.1 |
| 2013/0307829 | A1* | 11/2013 | Libin | G06F 3/016 |
| 2013/0329335 | A1* | 12/2013 | Obata | G06F 3/046 361/278 |
| 2014/0043242 | A1 | 2/2014 | Dietz et al. | |
| 2014/0078109 | A1 | 3/2014 | Armstrong-Muntner | |
| 2014/0214206 | A1* | 7/2014 | Steinberg | G06F 3/016 700/258 |
| 2014/0218338 | A1* | 8/2014 | Kim | G06F 3/041 345/174 |
| 2015/0212578 | A1 | 7/2015 | Lor et al. | |
| 2016/0342211 | A1* | 11/2016 | Yoest | G06F 3/016 |
| 2017/0068340 | A1 | 3/2017 | Zimmerman et al. | |
| 2017/0285774 | A1 | 10/2017 | Parikh et al. | |
| 2017/0285775 | A1* | 10/2017 | Park | G06F 3/03545 |
| 2017/0361639 | A1* | 12/2017 | Kaneda | B43K 27/006 |
| 2018/0046249 | A1* | 2/2018 | Peretz | G06F 3/03545 |
| 2018/0081458 | A1* | 3/2018 | Horie | G06F 3/046 |

FOREIGN PATENT DOCUMENTS

| | | |
|---|---|---|
| CN | 105573529 | 5/2016 |
| CN | 205210836 | 5/2016 |
| CN | 107924242 | 4/2018 |
| EP | 3002958 | 4/2016 |
| WO | WO 2008/079714 | 7/2008 |
| WO | WO 2018/031315 | 2/2018 |

OTHER PUBLICATIONS

Chinese Evaluation Report for Utility Model Patent from Application No. 201821580067.7, dated Nov. 19, 2019, 11 pages including English language translation.

* cited by examiner

STYLUS WITH HAPTIC FEEDBACK FOR TEXTURE SIMULATION

TECHNICAL FIELD

The present description relates generally to handheld devices, such as styluses, and, more particularly, to touch-based input devices that can provide haptic feedback to a user.

BACKGROUND

A variety of handheld input devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
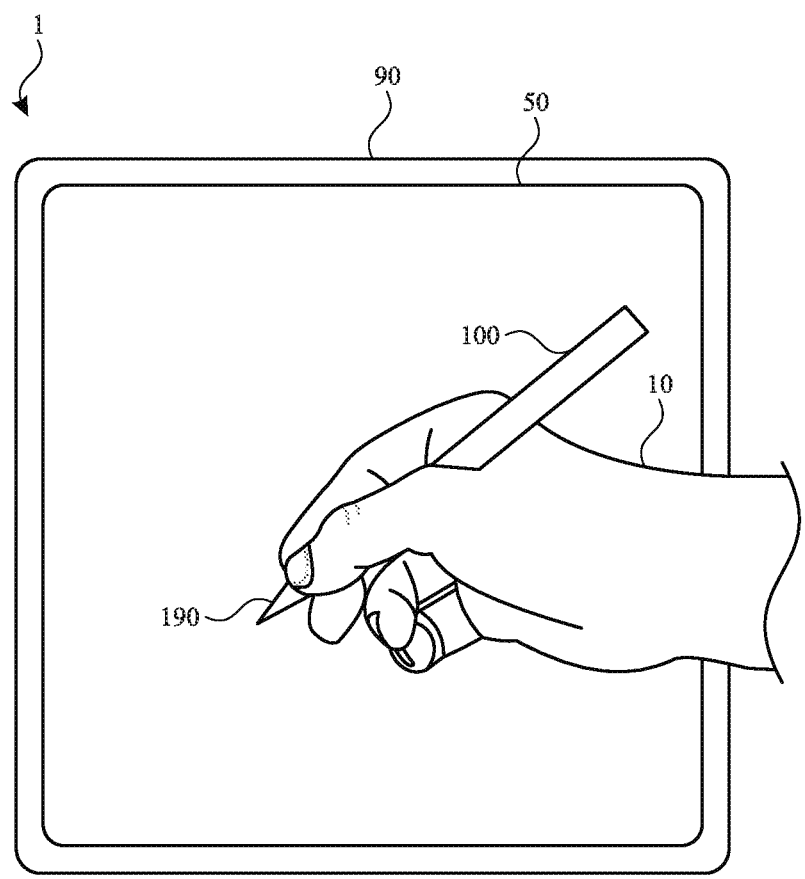
FIG. 1 illustrates a view of a system including a stylus and an external device, according to some embodiments of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a display surface and/or a touch panel receive tactile input from a user and also provide haptic feedback to a user. For example, one or more vibration devices located under a touch panel of an electronic device can provide haptic feedback to a user by way of vibrations when the user is touching the touch screen. Such vibrations can be utilized to convey a variety of different information to a user, such as information regarding one or more touch inputs that a user has provided, alerts, or status of the electronic device or one or more applications executing thereupon.

Haptic feedback provided via devices with a display surface and/or a touch panel may not convey information adequately to a user when a stylus or other touch-based input device is utilized. In such a case, the user may not be directly touching the surface of the device that provides haptic feedback. As such, the user may not perceive the haptic feedback provided on the surface. Additionally, some existing styluses may provide haptic feedback generally across an entirety of the device. Such configurations may require greater power consumption and larger haptic feedback components than would be required with components for providing haptic feedback at targeted locations.

In accordance with embodiments disclosed herein, improved styluses can detect input from a user upon pressing a tip of a stylus to a surface of an external device. Such styluses can also provide haptic feedback at the tip to provide specific tactile sensations while using the stylus. For example, the haptic feedback can be provided at the tip to render texture sensations to simulate drawing on a textured surface with the stylus. By providing haptic feedback at the tip rather than generally across the entire stylus, the haptic feedback can more accurately mimic the sensation of a writing instrument on a textured surface. Both the input functions and the haptic feedback functions can be performed based on movement of the tip. As such, the same tip that is used to provide inputs can receive haptic feedback during use.

These and other embodiments are discussed below with reference to FIGS. 1-11. However, those skilled in the art will readily appreciate that the detailed description given herein with respect to these figures is for explanatory purposes only and should not be construed as limiting.

A touch-based input device in accordance with embodiments disclosed herein can include any device that is held, worn, or contacted by a user for providing input and/or receiving feedback. The touch-based input device can be used alone or in conjunction with another device. For example, FIG. 1 illustrates a system 1 including a stylus 100 and an external device 90 having a surface 50, according to some embodiments of the subject technology. The stylus 100 can be held by a user 10 and operate as a touch-based input device for use with the external device 90.

The surface 50 of the external device 90 can include a display surface and/or a touch panel for interacting with the stylus 100 when contacted thereby. The external device 90 utilizes the display to render images to convey information to the user. The display can be configured to show text, colors, line drawings, photographs, animations, video, and the like. The surface 50 of the external device 90 can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types.

The stylus 100 can include a tip 190 for contacting the surface 50. Such contact can be detected by the external device 90 and/or the stylus 100. For example, the stylus 100 can include one or more sensors that detect when the tip 190 contacts and applied pressure to the surface 50. Such sensors can include one or more contact sensors, capacitive sensors, touch sensors, cameras, piezoelectric sensors, pressure sensors, proximity sensors, electric field sensors, photodiodes, and/or other sensors operable to detect contact with the surface 50. Such sensors can optionally operate cooperatively with the external device 90 to detect contact with the surface 50.

Figure 2:
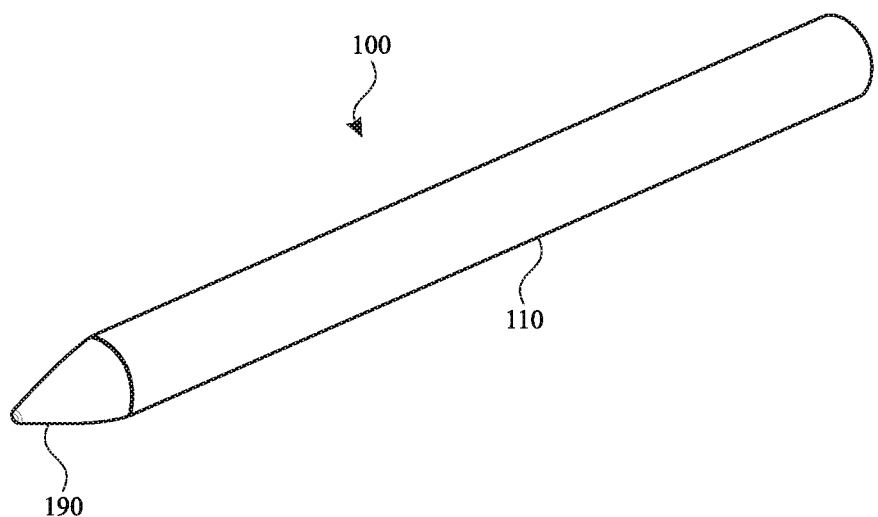
FIG. 2 illustrates a perspective view of the stylus of FIG. 1, according to some embodiments of the subject technology.

The stylus 100 can support handling and operation by a user. In particular, the stylus 100 can receive inputs from a user at the tip 190 and provide haptic feedback at the tip 190. FIG. 2 illustrates a stylus 100, according to some embodiments of the subject technology. According to some embodiments, for example as illustrated in FIG. 2, the stylus 100 can include a housing 110 that provides an outermost cover along at least a portion of the length of the stylus 100. A user can grip the stylus 100 at a user grip region along a portion of the housing 110 during use of the stylus 100. The housing 110 can define an outermost surface along a portion of the stylus 100.

Figure 3:
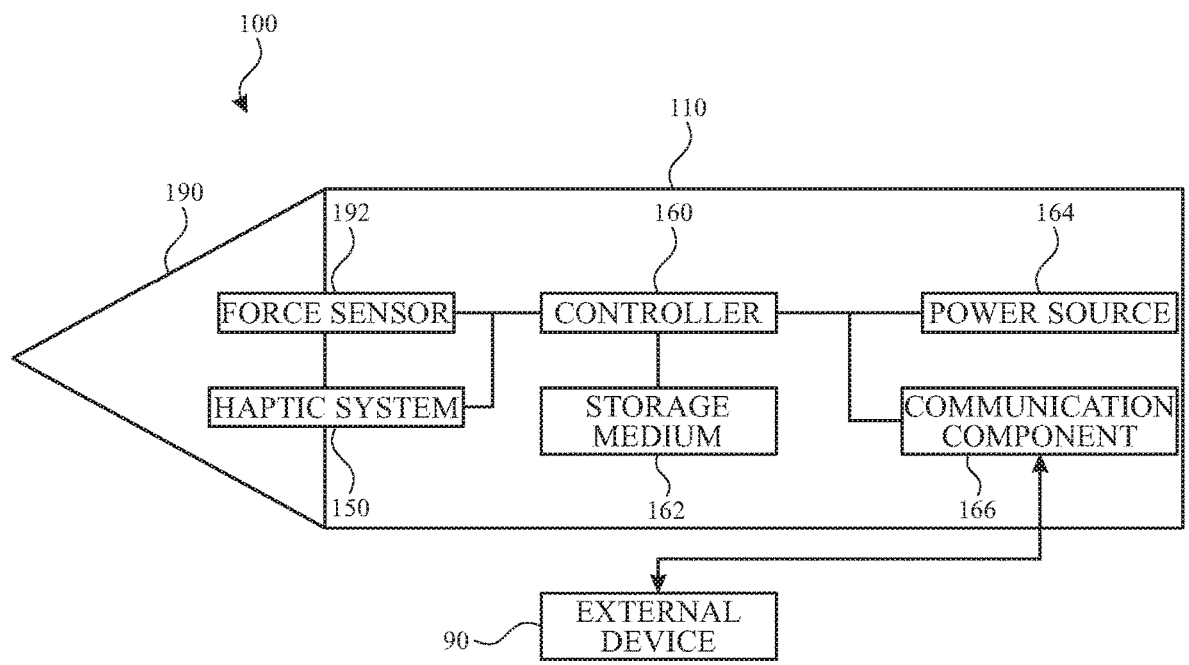
FIG. 3 illustrates a block diagram of the stylus and the external device of FIG. 1, according to some embodiments of the subject technology.

The stylus 100 can detect user inputs and provide haptic feedback at the tip 190. As shown in FIG. 3, the stylus 100 can include a force-sensing system 192 and a haptic feedback system 150 that can both operate based on interactions between the tip 190 and the housing 110. The force-sensing system 192 can be operated to detect user inputs at the tip 190 of the stylus 100. The haptic feedback system 150 can be operated to provide haptic feedback at the tip 190 of the stylus 100.

The force-sensing system 192 can interact with both the tip 190 and the housing 110 to detect relative motion of the tip 190 and the housing 110. For example, the force-sensing system 192 can be operated to detect when the tip 190 is contacting a surface, such as the surface of the external device 90. The detection can be based on movement of the tip 190 relative to the housing 110. Accordingly, the force-sensing system 192 can be directly or indirectly connected to both the tip 190 and the housing 110 to detect relative motion there between. The force-sensing system 192 can include a component that converts mechanical motion of the tip 190 into an electric signal. The force-sensing system 192 can include one or more contact sensors, capacitive sensors, touch sensors, strain gauges, cameras, piezoelectric sensors, pressure sensors, photodiodes, and/or other sensors. The force-sensing system 192 can detect both the presence and magnitude of a force.

In use, a user may manipulate the stylus 100 and apply a force to a surface of the external device 90. A corresponding reaction force may be transferred through the tip 190 of the stylus 100 connected to an electromechanical coupling and to the force-sensing system 192 of the stylus 100. The force-sensing system 192, or a portion thereof, may deform in response which may be measured and used to estimate the applied force. The force-sensing system 192 can be used to produce a non-binary output that corresponds to the applied force. For example, the force-sensing system 192 can be used to produce an output that represents a magnitude that varies in accordance with a variable amount of applied force.

The haptic feedback system 150 can interact with both the tip 190 and the housing 110 to provide haptic feedback at the tip 190. For example, the haptic feedback system 150 can be operated to move the tip 190 relative to the housing 110. Accordingly, the haptic feedback system 150 can be directly or indirectly connected to both the tip 190 and the housing 110 to produce relative motion. The haptic feedback system 150 can include a component that converts an electric signal into mechanical motion. The haptic feedback system 150 can include one or more electromagnets, linear actuators, resonant actuators, eccentric rotating mass actuators, piezoelectric actuators, and/or other actuators.

In use, the haptic feedback system 150 can be operated to provide haptic feedback while the user is applying the tip 190 of the stylus 100 to a surface, such as the surface 50 of the external device 90. The haptic feedback can be provided based on a variety of conditions and parameters. For example, the haptic feedback can be provided at the tip 190 to render texture sensations to simulate drawing on a textured surface with the stylus 100. Additional details regarding the haptic feedback are described further herein.

As used herein, relative motion of the tip 190 and the housing 110 can refer to motion of either the tip 190, the housing 110, or both. For example, the tip 190 can remain stationary while the housing 110 moves (e.g., while the tip 190 is pressed against a surface). By further example, the housing 110 can remain stationary while the tip 190 moves (e.g., while the housing 110 is held by a user). By further example, the tip 190 and the housing 110 can both move in a manner that changes their positions relative to each other. It will be appreciated that relative motion can be based on any frame of reference.

As further shown in FIG. 3, the stylus 100 can include a controller 160 and a non-transitory storage medium 162. The non-transitory storage medium 162 can include, for example, a magnetic storage medium, optical storage medium, magneto-optical storage medium, read-only memory, random access memory, erasable programmable memory, flash memory, or combinations thereof. According to some embodiments, the controller 160 can execute one or more instructions stored in the non-transitory storage medium 162 to perform one or more functions. For example, the non-transitory storage medium 162 can store one or more haptic profiles that the haptic feedback system 150 may utilize to provide haptic feedback. In some cases, the stylus 100 may retrieve a specific haptic profile utilizing one or more references and/or other codes detected from a surface utilizing the force-sensing system 192 and/or received from the external device 90 associated with the surface.

As further shown in FIG. 3, the stylus 100 can include a power source 164, such as one or more batteries and/or power management units. The stylus 100 can include components for charging the power source 164.

As further shown in FIG. 3, the stylus 100 can include a communication component 166 for communicating with the external device 90 and/or another device. The communication component 166 can include one or more wired or wireless components, WiFi components, near field communication components, Bluetooth components, and/or other communication components. The communication component 166 can include one or more transmission elements, such as one or more antennas. Alternatively or in combination, the communication component 166 can include an interface for a wired connection to the external device 90 and/or another device.

The stylus 100 can include other components including, but not limited to, displays, sensors, switches (e.g., dome switches), buttons, voice coils, and/or other components. The stylus 100 can detect environmental conditions and/or other aspects of the operating environment of the stylus 100 with an environmental sensor such as an ambient light sensor, proximity sensor, temperature sensor, barometric pressure sensor, moisture sensor, and the like. The stylus 100 can detect motion characteristics of the stylus 100 with a motion sensor such as an accelerometer, a gyroscope, a global positioning sensor, a tilt sensor, and so on for detecting movement and acceleration of the stylus 100. The stylus 100 can detect biological characteristics of the user manipulating the stylus with a biosensor that detects skin temperature, heart rate, respiration rate, blood oxygenation level, blood volume estimates, blood pressure, or a combination thereof. The stylus 100 can estimate, quantify, or estimate a property of an object nearby or otherwise external to the stylus 100 with a utility sensor such as magnetic field sensors, electric field sensors, color meters, acoustic impedance sensors, pH level sensor, material detection sensor, and so on. Such data may be used to adjust or update the operation of the stylus 100 and/or may communicate such data to the external device 90 to adjust or update the operation thereof.

The external device 90 can also include components that facilitate operation of the stylus 100. For example, the external device 90 can include one or more of a processor, a memory, a power supply, one or more sensors, one or more communication interfaces, one or more data connectors, one or more power connectors, one or more input/output devices, such as a speaker, a rotary input device, a microphone, an on/off button, a mute button, a biometric sensor, a camera, a force and/or touch sensitive trackpad, and so on. In some embodiments, a communication interface of the external device 90 facilitates electronic communications between the external device 90 and the stylus 100.

Figure 4:
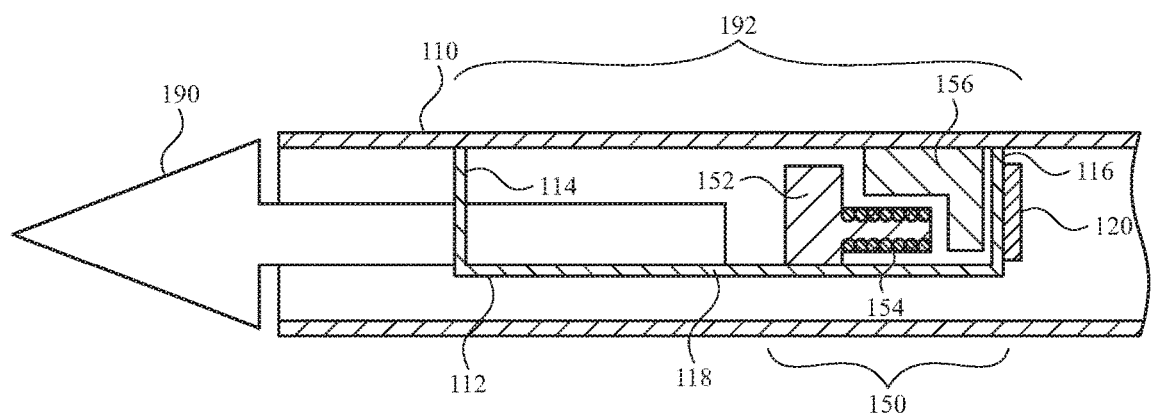
FIG. 4 illustrates a partial sectional view of a stylus, according to some embodiments of the subject technology.

A stylus can include systems that facilitate force detection at a tip thereof as well as haptic feedback delivery at the tip. As shown in FIG. 4, a stylus 100 can include both a force-sensing system 192 and a haptic feedback system 150 that interact with both the tip 190 and the housing 110 of the stylus 100. The force-sensing system 192 and the haptic feedback system 150, or portions thereof, can be located within the housing 110.

According to some embodiments, the force-sensing system 192 can include a support member 112, such as a cantilevered sled, that can move inwardly with respect to the housing 110 in response to a force at the tip 190. The force-sensing system 192 can be directly or indirectly connected to the tip 190 such that the force-sensing system 192 and components thereof (e.g., support member 112) move with or in response to the tip 190 as it moves relative to the housing 110.

The support member 112 can include a front cantilevered leg 114 and/or a rear cantilevered leg 116 that are coupled together or joined by a lateral bed 118 that extends between the two cantilevered legs. The front cantilevered leg 114 and the rear cantilevered leg 116 can be directly or indirectly connected to the housing 110 of the stylus 100. For example, the front cantilevered leg 114 and the rear cantilevered leg 116 may be fixed to one or more internal components of the stylus. In some implementations, the legs are welded to a sleeve or chassis using a laser-welding or other precision welding process. The legs may also be fixed using a mechanical tab, fastener, or other mechanical attachment technique. The support member 112 may include a resilient or compliant material that is configured to deflect or bend without yielding or breaking. A force sensor 120, such as a strain-sensitive electrode, is positioned on a portion of the sled, such as a back surface of the rear cantilevered leg 116. Additionally or alternatively, multiple strain-sensitive electrodes may be disposed on one or more surfaces of the rear cantilevered leg 116 or another portion of the force-sensing system 192.

Figure 5:
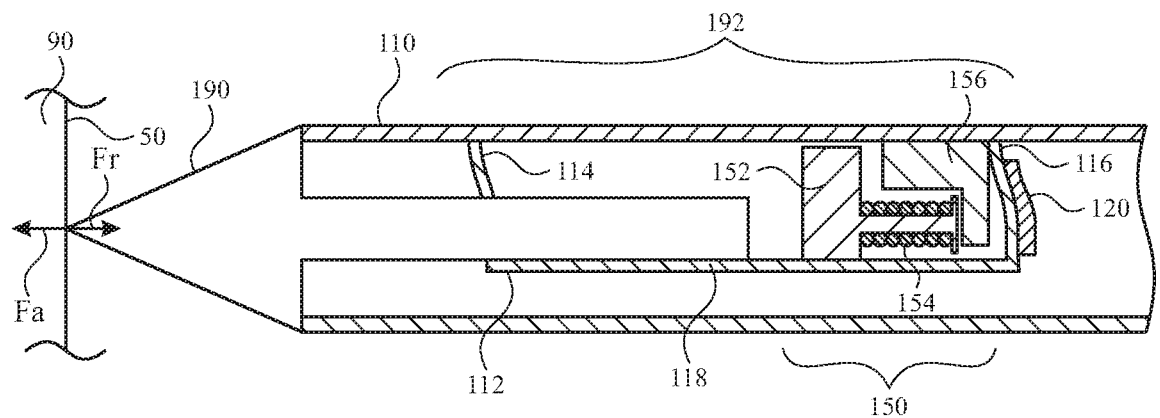
FIG. 5 illustrates a partial sectional view of the stylus of FIG. 4, according to some embodiments of the subject technology.

As shown in FIG. 5, when the tip 190 of the stylus 100 applies a force $F_a$ to a surface 50, and an equal and opposite reaction force $F_r$ is conveyed to the force-sensing system 192 by the tip 190, it causes the tip 190 to partially withdraw or deflect inward, in turn causing the front cantilevered leg 114 and the rear cantilevered leg 116 to deflect or deform. The force sensor 120 is deformed as a result of the deformation of the rear cantilevered leg 116. The deformation of the force sensor 120 can be measured by an electrical circuit in order to determine the magnitude of the reaction force $F_r$. The force sensor 120 can also be used to determine an amount of deflection of the tip 190. This determination can be used to further determine the relative positions of the tip 190 and the housing 110, as discussed further herein.

The foregoing description of the force-sensing system 192 depicted in FIGS. 4 and 5 are presented, generally, for purposes of explanation, and to facilitate a general understanding of a force-sensitive structure and coordination engines as described with respect to stylus embodiments disclosed herein. However, it will be apparent to one skilled in the art that some of the specific details presented herein may not be required in order to practice a particular described embodiment, or an equivalent thereof. Particularly, it may be understood that the force-sensing system 192 depicted in FIGS. 4 and 5 can be implemented in a number of suitable and implementation-specific ways. For example, as noted above, the force sensor 120 can be any mechanism that detects relative movement of the tip 190 and the housing 110. It will be recognized that the support member 112 can omit one or both of the front cantilevered leg 114 and the rear cantilevered leg 116. It will be further recognized that the tip 190 can be directly or indirectly connected to a force sensor 120.

Figure 6:
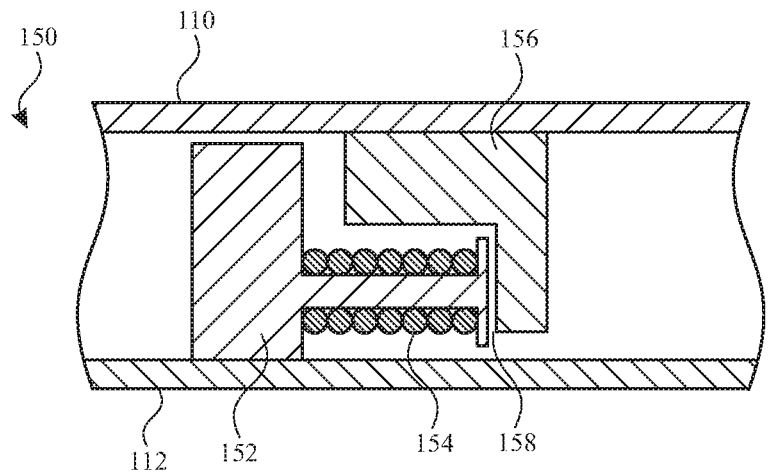
FIG. 6 illustrates a sectional view of a haptic feedback system of a stylus, according to some embodiments of the subject technology.
Figure 7:
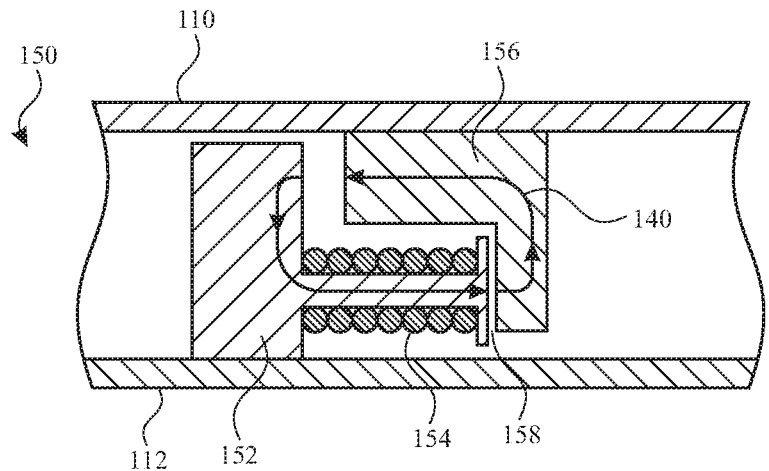
FIG. 7 illustrates a sectional view of the haptic feedback system of FIG. 6, according to some embodiments of the subject technology.

As shown in FIGS. 6 and 7, the haptic feedback system 150 can include mechanisms that facilitate haptic feedback. According to some embodiments, the haptic feedback system 150 can include a first magnetic element 152 moveable with the tip 190 as the tip 190 moves relative to the housing 110. For example, the first magnetic element 152 can be directly or indirectly (e.g., via the bed 118) connected to the tip 190. The haptic feedback system 150 can further include a second magnetic element 156 moveable with the housing 110 as the tip 190 moves relative to the housing 110. Accordingly, relative movement of the first magnetic element 152 and the second magnetic element 156 can directly correlate with relative movement of the tip 190 and the housing 110. A gap 158 is defined between the first magnetic element 152 and the second magnetic element 156 to provide an amount of relative travel. The size of the gap 158 changes based on operation of the haptic feedback system 150.

The first magnetic element 152 and/or the second magnetic element 156 can include a temporary magnet of a soft magnetic material or a permanent magnet of a hard magnetic material. As used herein, "magnet" can include a magnet of a hard magnetic material and/or a magnet of a soft magnetic material. Hard magnetic materials include materials that retain their magnetism even after the removal of an applied magnetic field. Magnets that include hard magnetic material can form permanent magnets. Hard magnetic materials include neodymium (NdFeB), iron-neodymium, iron-boron, cobalt-samarium, iron-chromium-cobalt, and combinations or alloys thereof. Soft magnetic materials include materials that are responsive to magnetic fields, but do not retain their magnetism after removal of an applied magnetic field. Magnets that include soft magnetic material can form temporary magnets. Soft magnetic materials include iron, iron-cobalt, iron-silicon, steel, stainless steel, iron-aluminum-silicon, nickel-iron, ferrites, and combinations or alloys thereof. It will be recognized that "hard magnetic" and "soft magnetic" does not necessarily relate to the rigidity of the materials.

The haptic feedback system 150 can further include a magnetic field generator to induce a magnetic field in the first magnetic element 152 and/or the second magnetic element 156. For example, a coil 154 can be wrapped around the first magnetic element 152 and/or the second magnetic element 156. As such, the coil 154 can form an electromagnet with the first magnetic element 152 and/or the second magnetic element 156 as a magnetic core. Additionally or alternatively, the coil 154 can be positioned near the first magnetic element 152 and/or the second magnetic element 156. The coil can include one or more helical windings in one or more layers. It will be recognized that any number of windings and arrangements of the coil can be provided to induce a magnetic field. While the coil 154 illustrated in FIGS. 6 and 7 is shown wrapped around the first magnetic element 152, it will be appreciated that the coil 154 or another coil can be wrapped around the second magnetic element 156.

It will be recognized that various arrangements and alterations to the above description can be implemented to provide haptic feedback. For example, the first magnetic element 152 and the second magnetic element 156 can be exchanged such that the first magnetic element 152 is moveable with the housing 110 and the second magnetic element 156 is moveable with the tip 190. The first magnetic element 152 and/or the second magnetic element 156 can have a variety of shapes and sizes. Either one of the first magnetic element 152 and the second magnetic element 156 can extend into a recess defined in the other. For example, one can define an annulus or multiple longitudinal arms with an interior space defined therein. Multiple first magnetic elements 152 and/or the second magnetic elements 156 can be provided. These and other designs can be implemented to facilitate an induced magnetic field and magnetic forces between the magnetic elements.

As shown in FIG. 7, the coil 154 is operated to induce a magnetic field 140 in the first magnetic element 152 and/or the second magnetic element 156. When the coil 154 is activated with an electric current, the magnetic field 140 causes the first magnetic element 152 and the second magnetic element 156 to move under the influence of a magnetic force. For example, where the first magnetic element 152 and/or the second magnetic element 156 are temporary magnets of a soft magnetic material, the magnetic field 140 can cause the magnetic domains of the first magnetic element 152 and/or the second magnetic element 156 to align with the magnetic field 140. Where both the first magnetic element 152 and the second magnetic element 156 align with the magnetic field, the first magnetic element 152 and the second magnetic element 156 will be attracted toward each other while the coil 154 is activated. Additionally or alternatively, the first magnetic element 152 and/or the second magnetic element 156 can be a permanent magnet of a hard magnetic material. Based on the alignment (i.e., polarity) of such a permanent magnet, the magnetic field 140 causes the first magnetic element 152 and the second magnetic element 156 to attract toward or repel away from each other when the coil 154 is activated.

As the first magnetic element 152 and the second magnetic element 156 move relative to each other, the tip 190 and the housing 110 move relative to each other. As described above, the first magnetic element 152 is connected to the tip 190 to move with the tip 190 and the second magnetic element 156 is connected to the housing 110 to move with the housing 110 as the tip 190 moves relative to the housing 110. As such, magnetic forces between the first magnetic element 152 and the second magnetic element 156 are transmitted to the tip 190 and the housing 110 to cause relative movement there between. The gap 158 defined between the first magnetic element 152 and the second magnetic element 156 changes in size as the first magnetic element 152 and the second magnetic element 156 move relative to each other.

The haptic feedback can include movement of the tip 190 relative to the housing and along a longitudinal axis of the stylus 100. For example, the first magnetic element 152 and the second magnetic element 156 can be aligned along the longitudinal axis of the stylus 100. Movement from haptic feedback can be along the same axis as movements incurred upon application of the tip 190 to the surface 50 of the external device 90. The structure of the force-sensing system 192 can facilitate movement of the tip 190 generally along a given axis, as described herein. Additionally or alternatively, movement from haptic feedback can be along another axis or in multiple axes and directions.

In use, the coil 154 can be operated to provide haptic feedback while the user is applying the tip 190 of the stylus 100 to a surface, such as the surface 50 of the external device 90. The haptic feedback can be provided based on a variety of conditions and parameters. For example, the haptic feedback can be controlled by providing an electric current to the coil 154. The induced magnetic field 140 and corresponding magnetic force between the first magnetic element 152 and the second magnetic element 156 is based on the current in the coil 154. As such, the current can have a duration, amplitude, frequency, waveform, duty cycle, or other parameters as desired for a desired and corresponding haptic feedback.

For example, the tip 190 can be made to vibrate by applying a control signal to the coil 154. The control signal may be a wave having a predetermined amplitude and/or frequency. When the control signal is applied, the induced magnetic field causes the tip 190 to vibrate at the frequency of the control signal. The frequency can be in a range between 10 Hz and 5,000 Hz, 50 Hz and 1,000 Hz, or 100 Hz and 500 Hz. The frequency of the control signal may be adjusted to alter the rate of movement of the tip 190 if a certain vibration is desired. The amplitude of the control signal may be correlated to the magnitude of movement of the tip 190, and may be adjusted to alter the intensity of the vibration.

The haptic feedback system 150 can provide haptic feedback to a user by moving the tip 190 of the stylus 100 relative to the housing 110. In contrast to haptic feedback applied directly to the housing, haptic feedback provided at the tip 190 more directly provides sensations relating to the tip 190. For example, haptic feedback can be provided while the tip 190 is applied to the surface 50. As the tip 190 moves over a smooth surface, the movement of the tip 190 relative to the housing simulates the sensation of moving an instrument over a textured surface. Accordingly, the haptic feedback can render texture sensations to simulate drawing on a textured surface with the stylus. Such sensations can be more desirable to a user who is familiar with working on a textured surface. The parameters of the haptic feedback can be selected based on the texture that is desired to be simulated. For example, different types of surfaces (paper, canvas, etc.) can be simulated differently based on preprogrammed and user-selectable profiles. By further example, different types of instruments (e.g. pencil, ball-point pen, fountain pen, highlighter, brush, etc.) can be simulated differently based on preprogrammed and user-selectable profiles.

The texture sensations can be altered based on operation of the stylus 100. For example, the haptic feedback can be provided when the tip 190 is applied to and moving along the surface 50. The force of the contact, the speed of the stylus, the orientation of the stylus, and/or the textured surface to be simulated can be considered to determine the operation of the haptic feedback system 150. The parameters of the haptic feedback can be altered based on the speed and/or direction at which the tip 190 moves along the surface 50. By further example, a larger magnitude force applied with the tip 190 to the surface 50 can cause an increase in the magnitude of the haptic feedback.

The haptic feedback system 150 can provide haptic feedback for one or more other purposes. According to some embodiments, the haptic feedback can notify the user based on a message, alert, or alarm. Such notifications can be accompanied by other feedback, including tactile, auditory, and/or visual feedback on the stylus 100 and/or the external device. According to some embodiments, the haptic feedback can provide confirmation that a user selection (e.g., made with the stylus 100) has been received by the external device 90. According to some embodiments, the haptic feedback can inform the user regarding status or operation of the external device 90.

The haptic feedback system 150 can provide haptic feedback to a user based on different regions of the surface 50 of the external device 90. For example, the tip 190 of the stylus 100 can be used to contact the surface 50 of the external device 90. Some or all of a boundary can optionally be displayed on the surface 50 as a reference for the user. The boundary can be based on a user input or another defined region of the surface 50. When the tip 190 is outside the boundary, the haptic feedback system 150 can provide haptic feedback to indicate to the user that the user is drawing outside the boundary. When the tip 190 returns to within the boundary, the haptic feedback system 150 can cease providing haptic feedback or provide different haptic feedback. Accordingly, the haptic feedback provided by the stylus 100 can indicate to the user when correction is needed to conform to a shape, letter, number, or other character that is to be traced by the user.

Operation of the haptic feedback system 150 of the stylus 100 can be performed in combination with a haptic feedback system of the external device 90. For example, haptic feedback can be provided by the stylus 100 and the external device 90 simultaneously and/or in sequence.

Figure 8:
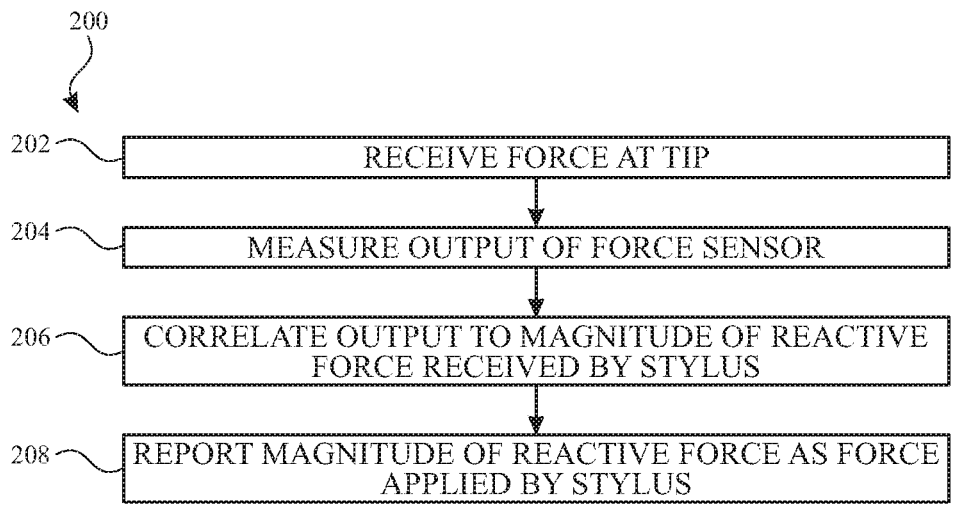
FIG. 8 illustrates a flow chart of a process for detecting a user input, according to some embodiments of the subject technology.

FIG. 8 illustrates a flow chart depicting operations of a process 200 for estimating a force applied by a stylus to a surface of an external device. At operation 202, the force-sensing system detects a reaction force at the tip of the stylus. At operation 204, an output (e.g., electrical property) of a force sensor mechanically coupled to the tip of the stylus is estimated. The output can be resistance, capacitance, accumulated charge, inductance, or another electrical property. At operation 206, the estimated electrical property is correlated to a magnitude of force, (e.g., reaction force) that is received by the tip of the stylus. The correlation operation can be performed using any number of suitable techniques. In some cases, the electrical property changes linearly with the force applied to the force sensor, whereas in other cases, the electrical property changes exponentially with the force applied to the force sensor. At operation 208, the estimated magnitude of the reaction force is communicated (e.g., to an external device), as a magnitude of force applied by the stylus as a vector or scalar quantity using any suitable encoded or non-encoded format.

Figure 9:
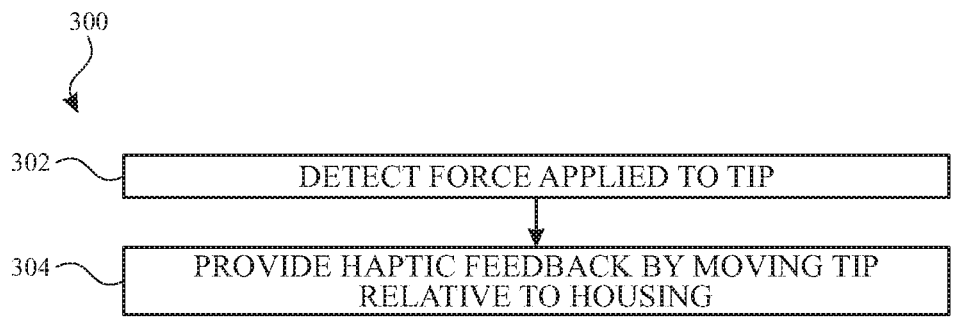
FIG. 9 illustrates a flow chart of a process for providing haptic feedback, according to some embodiments of the subject technology.

FIG. 9 illustrates a flow chart depicting operations of a process 300 for providing haptic feedback while a stylus is in use. The haptic feedback may enhance operation of the stylus while in use, or otherwise be altered based on conditions of the stylus during use. For example, where texture sensations are simulated by the haptic feedback system, the stylus can coordinate operation of the haptic feedback system with movement of the tip along a surface of an external device.

At operation 302, a reaction force is received at a tip of the stylus and detected by the force-sensing system. Operation 302 can include one or more of the operations of process 200. The detecting can include detection of a force applied to a tip that moves the tip relative to the housing of the stylus. Conditions of the contact can also be detected, measured, and/or recorded. For example, the force-sensing system can detect the force of the contact, the speed of the stylus, and/or the orientation of the stylus. One or more sensors of the stylus and/or the external device can be employed to make such determinations. Appropriate communications between the stylus and the external device can be managed to coordinate the determinations.

At operation 304, haptic feedback is provided while the reaction force is applied to the tip by pressing the tip to the surface of the external device. For example, a magnetic field can be induced (e.g., with a coil) in a first magnetic element moveable with the tip and a second magnetic element moveable with the housing. The magnetic field causes haptic feedback by moving the tip relative to the housing. The force of the contact, the speed of the stylus, the orientation of the stylus, and/or the textured surface to be simulated can be considered to determine the operation of the haptic feedback system 150. The parameters of the haptic feedback can be altered based on one or more of these conditions.

Figure 10:
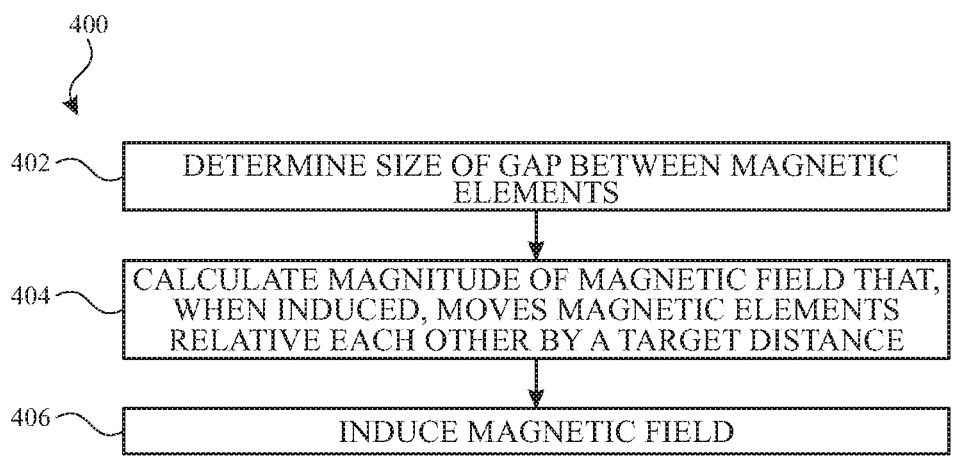
FIG. 10 illustrates a flow chart of a process for providing haptic feedback, according to some embodiments of the subject technology.

FIG. 10 illustrates a flow chart depicting operations of a process 400 for providing haptic feedback based on conditions of the stylus while in use. Haptic feedback with particular properties may be desired. However, because the tip is moved by both reaction forces and haptic feedback, the application of haptic feedback can be informed by the effect of a reaction force on the tip. For example, where magnetic elements are used to attract and/or repel, the distance between the magnetic elements affects how they will react to each other when magnetized. Accordingly, the distance between the magnetic elements can be determined as part of the process 400 for providing haptic feedback.

At operation 402, a size of a gap between magnetic elements is determined. The size of the gap can correspond to the amount of deflection in the force-sensing system that results from a reaction force applied to the tip of the stylus.

For example, while the tip is pressed against the surface of the external device. The tip moves relative to the housing in a manner that is detectable by the force-sensing system. The output of the force sensor corresponds to the amount of movement by the tip.

At operation 404, an appropriate magnetic field and/or current is calculated to produce the desired haptic feedback. The haptic feedback can be provided with a desired amount of travel of the tip relative to the housing. A property of the magnetic field is calculated, such that, when the magnetic field is induced, it moves the magnetic elements relative to each other by a target distance. For example, the gap between the magnetic elements can be of a first distance (e.g., 100 µm, 110 µm, 120 µm, 130 µm, 140 µm, 150 µm), and the desired haptic feedback can alter the gap by a target distance (e.g., 10 µm, 20 µm, 30 µm, 40 µm, 50 µm, 60 µm, 70 µm, 80 µm, 90 µm, 100 µm). The magnitude of the magnetic field required to move the magnetic elements by the target distance is inversely proportional to the square of the distance between the magnetic elements. As such, inducing a given magnetic field will cause different types of haptic feedback depending on the position of the tip relative to the housing. With the distance between the magnetic elements having been determined based on the force-sensing system in operation 402, the required magnetic field can be calculated. It will be understood that calculating and inducing a desired magnetic field can include or be replaced by calculating and inducing a desired current in the coil. For example, the magnetic field is directly proportional to the current applied to the coil. As such, either the magnetic field or the current can be calculated.

At operation 406, the magnetic field is induced, for example by applying the current to the coil. Accordingly, haptic feedback is provided while the reaction force is applied to the tip. Despite the application of the reaction force deflecting the tip from its rest position, desired haptic feedback is provided in a predictable and accurate manner.

Figure 11:
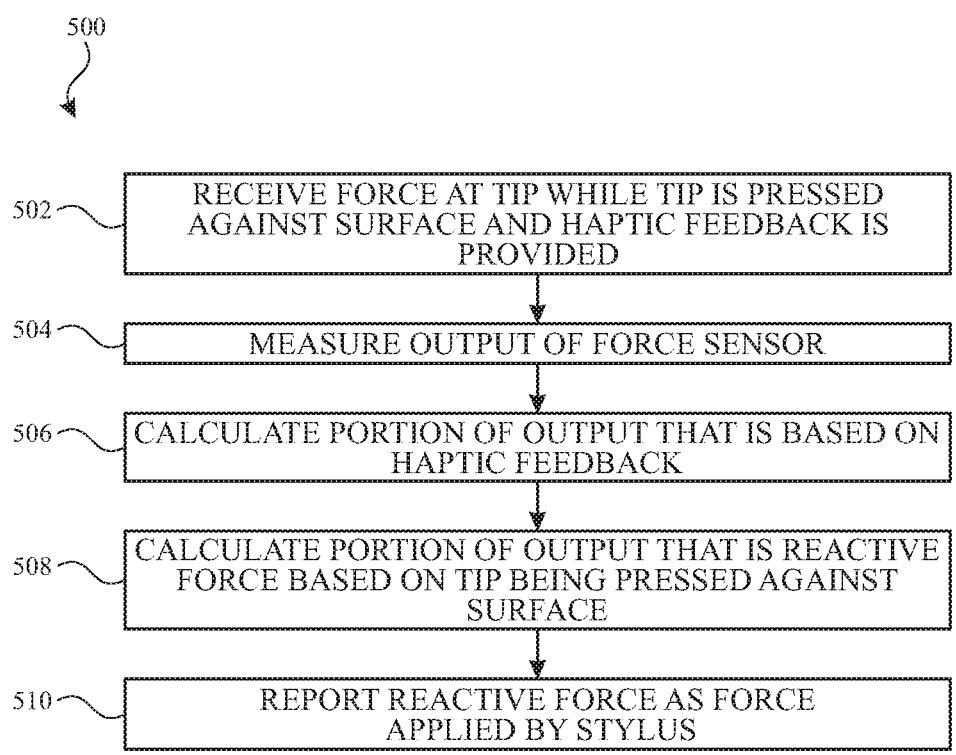
FIG. 11 illustrates a flow chart of a process for detecting a user input and providing haptic feedback, according to some embodiments of the subject technology.

FIG. 11 illustrates a flow chart depicting operations of a process 500 for detecting a user input and providing haptic feedback. The effect of haptic feedback can be considered when detecting a user input at the tip. For example, the determination of a user input can include compensating for a known or expected offset due to the presence of haptic feedback.

Where force sensing and haptic feedback occur simultaneously, the force-sensing system can operate while the haptic feedback system is providing haptic feedback by detecting a voltage across the piezoelectric device and compensating for a known or expected offset due to the haptic feedback system.

At operation 502, the force-sensing system detects a reaction force at the tip while the tip is pressed against a surface of an external device and while haptic feedback is provided. At operation 504, an output (e.g., electrical property) of a force sensor mechanically coupled to the tip of the stylus is estimated. The output can be resistance, capacitance, accumulated charge, inductance, or another electrical property. While haptic feedback is being applied, the output includes contributions from the reaction force as well as the haptic feedback. As such, the output alone does not represent only the reaction force resulting from user input.

At operation 506, the contribution of the haptic feedback on the output is calculated. For example, a portion of the output is determined to be the result of the haptic feedback. The force resulting from the haptic feedback can be calculated based on known parameters of the stylus and the haptic feedback. For example, the properties of the magnetic elements and the coil can be known or determined. Furthermore, the properties of the current and the induced magnetic field are controlled by the stylus and therefore are known. The force resulting from the current and the induced magnetic field can be calculated based on these known properties.

At operation 506, the contribution of the reaction force on the output is calculated. For example, a portion of the output is determined to be the result of pressing the tip against the surface of the external device. This portion can be based on the total output offset by the portion thereof that is determined to be the result of the haptic feedback. The remaining portion can be determined to be based on the reaction force resulting from user input.

At operation 510, the estimated magnitude of the reaction force is communicated (e.g., to an external device), as a magnitude of force applied by the stylus as a vector or scalar quantity using any suitable encoded or non-encoded format.

As shown, improved styluses can detect input from a user upon pressing a tip of a stylus to a surface of an external device. Such styluses can also provide haptic feedback at the tip to provide specific tactile sensations while using the stylus. For example, the haptic feedback can be used to render texture sensations to simulate drawing on a textured surface with the stylus. Both the input functions and the haptic feedback functions can be performed in relation to the tip. As such, the same tip that is used to provide inputs can receive haptic feedback during use. Accordingly, properties of the user input applied to the tip can be determined even as haptic feedback is also being applied to the tip.

While some embodiments of touch-based input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the external device can be any device that interacts with a touch-based input device. For example, an external device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A stylus comprising:
   a housing;
   a tip moveable relative to the housing;
   a force sensor for detecting when a force is applied to the tip;
   a first magnetic element moveable with the tip;
   a second magnetic element moveable with the housing; and
   a coil configured to induce a magnetic field in the first magnetic element and/or the second magnetic element, such that, when the coil receives an electric current, the first magnetic element and the second magnetic element move relative to each other.

2. The stylus of claim 1, further comprising a support member connecting the tip to the housing and configured to deflect upon application of the force to the tip, wherein the force sensor comprises a strain gauge that is sensitive to deflection of the support member, the first magnetic element is connected to the support member, and the second magnetic element is connected to the housing.

3. The stylus of claim 1, wherein the coil is wrapped around the first magnetic element and/or the second magnetic element.

4. The stylus of claim 1, wherein the first magnetic element and/or the second magnetic element comprises a soft magnetic material that is responsive to the magnetic field generated by the coil.

5. The stylus of claim 1, wherein the first magnetic element and the second magnetic element are configured to respond to the magnetic field by being attracted to each other.

6. The stylus of claim 1, wherein the first magnetic element and the second magnetic element are aligned along a longitudinal axis of the stylus.

7. The stylus of claim 1, wherein the force is configured to detect the force along a longitudinal axis of the stylus and the coil is configured to move the tip along the longitudinal axis of the stylus.

8. A stylus comprising:
   a housing;
   a tip;
   a force-sensing system for detecting movement of the tip relative to the housing when a force is applied to the tip; and
   a haptic feedback system comprising:
   a first magnetic element moveable with the tip;
   a second magnetic element moveable with the housing; and
   a coil configured to move the tip relative to the housing by inducing a magnetic field in the first magnetic element and/or the second magnetic element.

9. The stylus of claim 8, further comprising a controller operably connected to the force-sensing system to receive an output from the force-sensing system, the controller being further operably connected to the haptic feedback system to control the magnetic field.

10. The stylus of claim 9, wherein the controller is configured to control the magnetic field based on the output of the force-sensing system.

11. The stylus of claim 9, wherein the controller is configured to determine:
    a portion of the output that is based on the magnetic field; and
    a portion of the output that is based on the tip being pressed against a surface.

12. A method of controlling haptic feedback for a stylus, the method comprising;
    detecting, with a force sensor, a force applied to a tip of the stylus to move the tip relative to a housing of the stylus; and
    inducing a magnetic field in a first magnetic element moveable with the tip and a second magnetic element moveable with the housing to provide haptic feedback by moving the tip relative to the housing.

13. The method of claim 12, further comprising:
    determining, based on the detecting, a size of a gap between the first magnetic element and the second magnetic element; and
    calculating, based on the size of the gap, a magnitude of the magnetic field that, when induced, moves the first magnetic element relative to the second magnetic element by a target distance.

14. The method of claim 12, wherein the magnetic field is induced while the force is applied to the tip by pressing the tip to a surface of an external device.

15. The method of claim 12, wherein the detecting comprises comparing an output of the force sensor with an electric current applied to induce the magnetic field.

16. The method of claim 12, wherein the detecting comprises:
    receiving an output of the force sensor while the tip is pressed against a surface of an external device and the haptic feedback is provided;
    calculating a portion of the output that is based on the haptic feedback; and
    calculating a portion of the output that is based on the tip being pressed against the surface of the external device.

17. The method of claim 12, wherein the inducing comprises applying electric current to a coil wrapped around the first magnetic element and/or the second magnetic element.

18. The method of claim 12, wherein the haptic feedback comprises movement of the tip relative to the housing along a longitudinal axis of the stylus.

19. The method of claim 12, wherein the force applied to the tip is along a longitudinal axis of the stylus and the haptic feedback comprises movement of the tip relative to the housing along the longitudinal axis of the stylus.

* * * * *